United States Patent
Badding et al.

(10) Patent No.: US 9,673,483 B2
(45) Date of Patent: Jun. 6, 2017

(54) REACTIVE SINTERING OF CERAMIC LITHIUM ION ELECTROLYTE MEMBRANES

(71) Applicant: CORNING INCORPORATED, Corning, NY (US)

(72) Inventors: Michael Edward Badding, Campbell, NY (US); Indrajit Dutta, Horseheads, NY (US); Sriram Rangarajan Iyer, Cupertino, CA (US); Brian Alan Kent, Horseheads, NY (US); Nadja Teresia Lonnroth, Corning, NY (US)

(73) Assignee: Corning Incorporated, Corning, NY (US)

( * ) Notice: Subject to any disclaimer, the term of this patent is extended or adjusted under 35 U.S.C. 154(b) by 120 days.

(21) Appl. No.: 14/599,692

(22) Filed: Jan. 19, 2015

(65) Prior Publication Data

US 2016/0211546 A1 Jul. 21, 2016

(51) Int. Cl.
*C03B 19/06* (2006.01)
*H01M 10/0562* (2010.01)
(Continued)

(52) U.S. Cl.
CPC ......... *H01M 10/0562* (2013.01); *C01B 25/45* (2013.01); *C03B 19/06* (2013.01);
(Continued)

(58) Field of Classification Search
CPC .................. H01M 2300/0071; C03B 19/06
See application file for complete search history.

(56) References Cited

U.S. PATENT DOCUMENTS

| 6,030,909 A | 2/2000 | Fu |
|---|---|---|
| 8,431,287 B2 | 4/2013 | Teramoto |

(Continued)

FOREIGN PATENT DOCUMENTS

| JP | 1996302564 | 11/1996 |
|---|---|---|
| JP | 1997278106 | 10/1997 |

(Continued)

OTHER PUBLICATIONS

Aono et al; "Electrical Property and Sinterability of $LiTi_2(PO_4)_3$ Mixed With Lithium Salt ($Li_3PoO_4$ or $Li_3BO_3$)"; Solid State Ionics 47, 1991, 257-264.

Barre et al; "The Nasicon Solid Solution $Li_{1-x} La_{x/3} Zr2(PO_4)_3$: Optimization of the Sintering Process of Ionic Conductibity Measurements"; Ionics 2009, 15:681-687.

(Continued)

Primary Examiner — Erin Snelting
(74) Attorney, Agent, or Firm — John L. Haack (57) ABSTRACT

Disclosed herein are methods for making a solid lithium ion electrolyte membrane, the methods comprising combining a first reactant chosen from amorphous, glassy, or low melting temperature solid reactants with a second reactant chosen from refractory oxides to form a mixture; heating the mixture to a first temperature to form a homogenized composite, wherein the first temperature is between a glass transition temperature of the first reactant and a crystallization onset temperature of the mixture; milling the homogenized composite to form homogenized particles; casting the homogenized particles to form a green body; and sintering the green body at a second temperature to form a solid membrane. Solid lithium ion electrolyte membranes manufactured according to these methods are also disclosed herein.

14 Claims, 3 Drawing Sheets (51) Int. Cl.
*C01B 25/45* (2006.01)
*H01M 10/052* (2010.01)

(52) U.S. Cl.
CPC .. *H01M 10/052* (2013.01); *H01M 2300/0068* (2013.01); *H01M 2300/0071* (2013.01)

(56) References Cited

U.S. PATENT DOCUMENTS

| | | |
|---|---|---|
| 2013/0084504 A1 | 4/2013 | Badding |
| 2013/0137010 A1 | 5/2013 | Aitken et al. |
| 2014/0220454 A1 | 8/2014 | Furukawa |

FOREIGN PATENT DOCUMENTS

| | | |
|---|---|---|
| JP | 1997281274 | 10/1997 |
| JP | 2008171705 | 7/2008 |
| JP | 2008171706 | 7/2008 |
| JP | 2010006681 | 1/2010 |
| JP | 2010010110 | 1/2010 |

OTHER PUBLICATIONS

Fu et al; "Superionic Conductivity of Glass-Ceramics in the System $Li_2O$—$Al_2O_3$—$TiO_2$—$P_2O_5$" Solid State Ionics 96, 1997, 195-200.

Kobayashi et al; "Ionic Conductivity Enhancement in $LiTi_2(PO_4)_3$-Based Composite Electrolyte by the Addition of Lithium Nitrate" Journal of Power Sources, 68, 1997, 407-411.

Visco et al; "Lithium-Air"; Secondary Batteries-Metal-Air Systems 376-383.

Machine Translation of JP1996302564.
Machine Translation of JP1997278106.
Machine Translation of JP1997281274.
Machine Translation of JP2008171705.
Machine Translation of JP2008171706.
Machine Translation of JP2010006681.
Machine Translation of JP2010010110.

International Search Report, issued in connection with corresponding PCT application No. PCT/US2016/013818, Apr. 29, 2016.

Jovkumar S. Thokchom et al: "Superionic Conductivity in a Lithium Aluminum Germanium Phosphate Glass-Ceramic", Journal of the Electrochemical Society, vol. 155, No. 12, Oct. 8, 2008 (Oct. 8, 2008), p. A915-A919.

REACTIVE SINTERING OF CERAMIC LITHIUM ION ELECTROLYTE MEMBRANES

GOVERNMENT LICENSE RIGHTS

This invention was made with government support under PRIME AWARD number DE-EE-0005757, whereby Corning Incorporated performs under subcontract award number PPBC-CORNING IMI 10-2012, awarded by the Department of Energy. The government has certain rights to this invention.

FIELD OF THE DISCLOSURE

The present disclosure relates generally to methods for making ceramic lithium-ion solid electrolytes, and more specifically to reactive sintering processes for forming dense, homogeneous electrolyte membranes.

BACKGROUND

Solid electrolytes, also known as fast ion conductors, are materials that can function as solid state ion conductors and can be used, for example, in solid oxide fuel cells and lithium ion batters. In a lithium ion battery, for instance, lithium ions move from a negative electrode to a positive electrode during discharge (and back when charging) via the solid electrolyte. The solid electrolyte, such as lithium aluminum titanium phosphate (LATP), can conduct lithium ions through vacancies in the LATP crystal lattice. In lithium ion batteries, the solid electrolyte membrane can also provide a hermetic barrier between the anode and the cathode, which can prevent the anode and cathode from sharing a common electrolyte solution.

The ability to produce dense, conductive lithium ion electrolyte membranes is thus important to the development of lithium ion batteries. Various challenges may exist during the manufacture of such membranes, including manufacturing a membrane having sufficient density to be hermetic while still providing sufficient conductivity and economy. Conventional processes for producing hermetic membranes, for example, glass-ceramic processes, can produce dense, hermetic membranes, but often at the expense of other attributes such as conductivity and cost. Glass-ceramic processes can also be challenging because the starting composition is limited to those that can form a stable glass, thus limiting the glass-ceramic route to specific compositions (e.g., the glass-forming regions).

Glass-ceramic processes can also be limited by high operating temperatures, which can be in excess of 1000° C. The sintering of ceramic lithium ion electrolyte materials to a density sufficient to produce a hermetic membrane can be difficult due to vaporization of volatile lithium and/or phosphate species at temperatures greater than 1000° C. These limitations, in addition to restricting control of the process conditions, can also restrict the compositional space available for providing enhanced properties, such as conductivity and environmental stability.

To address these and other issues, Applicant previously disclosed a reactive sintering method for forming dense, hermetic electrolyte membranes. This method is disclosed in U.S. Patent Application Publication No. 2013/0137010, which is incorporated herein by reference in its entirety. The reactive sintering method involves combining reactive powders and heating them to simultaneously react the components and densify the reaction product. For instance, an amorphous, glassy, or low melting temperature solid reactant can be combined with a refractory oxide reactant to form a mixture, which can then be cast as a green body and reactively sintered.

The reactive sintering method can offer significant advantages over prior art glass-ceramic methods, for example, the ability to prepare a wider variety of compositions with higher conductivity and/or density. However, Applicant has discovered that the reactive sintering process may still have one or more disadvantages. For example, because electrolyte membranes can be very thin, e.g., less than 200 microns or even less than 100 microns, the performance of these thin membranes can be sharply impacted by inhomogeneity, such as localized pockets of inadequately mixed components or components that have settled out of the mixture. Furthermore, membranes produced according to the reactive sintering method may suffer from wrinkling and/or rupturing during and/or after firing, which can be caused, for instance, by organic materials in the green body and/or adhesion of the green body to setter plates during firing. A creep flattening step, e.g., annealing the membrane under a weight, may thus be required to produce a final product with sufficient flatness, which of course can add to the complexity and/or cost of the manufacturing process.

Accordingly, it would be advantageous to improve upon the reactive sintering methods previously disclosed by Applicant to provide hermetic electrolyte membranes with improved density, homogeneity, and/or flatness. It would also be advantageous to provide methods for making such membranes at lower temperatures, which can result in lower cost and/or improved process control.

SUMMARY

The disclosure relates, in various embodiments, to methods for making a solid lithium ion electrolyte membrane, the methods comprising combining a first reactant chosen from amorphous, glassy, or low melting temperature solid reactants with a second reactant chosen from refractory oxides to form a mixture; heating the mixture to a first temperature to form a homogenized composite, wherein the first temperature is between a glass transition temperature of the first reactant and a crystallization onset temperature of the mixture; milling the homogenized composite to form homogenized particles; casting the homogenized particles to form a green body; and sintering the green body at a second temperature to form a solid membrane.

Also disclosed herein are solid lithium ion electrolyte membranes having a composition represented by the formula $Li_{1+x-y}M_xM'_{2-x-y}M''_y(PO_4)_3$, wherein M is a 3+ ion, M' is a 4+ ion, M" is a 5+ ion, $0 \le x \le 2$, and $0 \le y \le 2$, and wherein the solid lithium electrolyte membranes are substantially flat. The solid membranes can, in some embodiments, have a thickness of less than about 200 microns, a density of at least about 95% of the theoretical density of the solid membrane, and a conductivity of at least about $1 \times 10^{-5}$ S/cm, such as at least about $1 \times 10^{-4}$ S/cm.

Solid electrolyte membranes produced as set forth herein may have a high density suitable for forming a hermetic barrier, while also providing high conductivity. Casting of homogenized particles can also allow for increased solid loading in the green body which can improve the final density of the membrane. Moreover, the membranes can have improved homogeneity, which can provide improved stability and/or longevity of the membrane. Further, higher solid loading in the green body may translate to relatively less organic materials, such as binders, plasticizers, etc., which can improve the flatness and/or integrity of the final product. As such, membranes produced according to the methods disclosed herein may not require an additional step of creep flattening, which can increase production yield and/or efficiency. Finally, the methods disclosed herein may allow for sintering at lower temperatures as compared to both the prior art glass-ceramic methods and Applicant's own previously disclosed reactive sintering methods. Lowering the process temperature can, in turn, lower production costs and/or improve process controls, especially in cases where volatile species, such as lithium and phosphate, are present. It should be noted, however, that one or more of such characteristics may not be present according to various embodiments of the disclosure, yet such embodiments are intended to fall within the scope of the disclosure.

Additional features and advantages of the invention will be set forth in the detailed description which follows, and in part will be readily apparent to those skilled in the art from that description or recognized by practicing the invention as described herein, including the detailed description which follows, the claims, and the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the invention.

BRIEF DESCRIPTION OF THE DRAWINGS

The following detailed description can be best understood when read in conjunction with the following drawings, in which.

DETAILED DESCRIPTION

Methods

Disclosed herein are methods for making a solid lithium ion electrolyte membrane, the methods comprising combining a first reactant chosen from amorphous, glassy, or low melting temperature solid reactants with a second reactant chosen from refractory oxides to form a mixture; heating the mixture to a first temperature to form a homogenized composite, wherein the first temperature is between a glass transition temperature of the first reactant and a crystallization onset temperature of the mixture; milling the homogenized composite to form homogenized particles; casting the homogenized particles to form a green body; and sintering the green body at a second temperature to form a solid membrane.

Embodiments of the disclosure will be discussed with reference to FIG. 1, which illustrates a flow diagram for producing homogenized particles according to non-limiting embodiments of the disclosure. The following general description is intended to provide an overview of the claimed methods and various aspects will be more specifically discussed throughout the disclosure with reference to the non-limiting embodiments, these embodiments being interchangeable with one another in the context of the general method discussed below.

Figure 1:
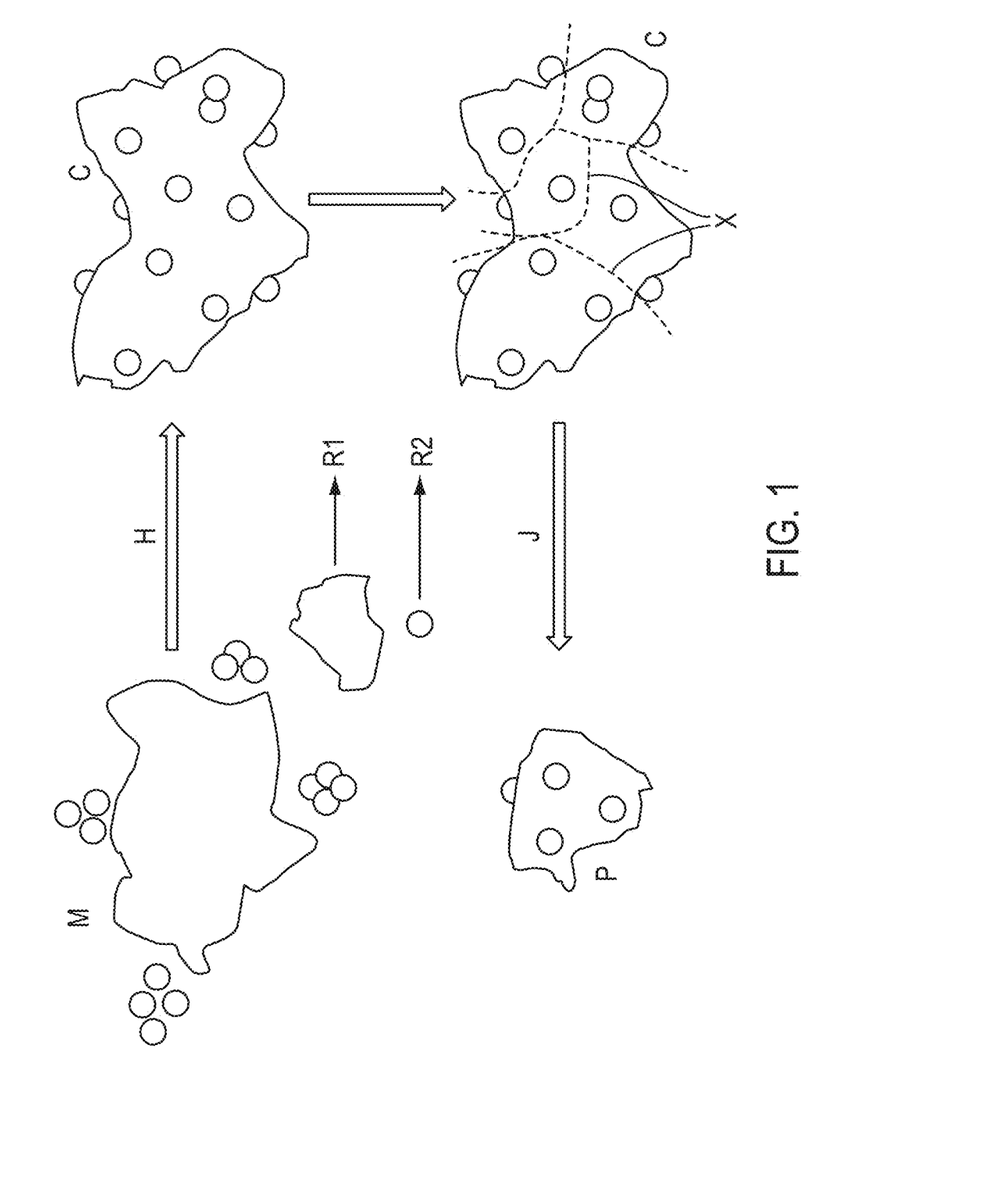
FIG. 1 is a flowchart illustrating the formation of homogenized particles according to various embodiments of the methods disclosed herein.

As demonstrated in FIG. 1, an initial mixture M can comprise the first reactant R1 and second reactant R2 as separate components. After a heating (or homogenization) step H at a first temperature, a homogenized composite C can be produced that comprises the first reactant R1 and the second reactant R2 as combined (but not reacted) components. After a milling step J, the composite C can be broken into separate composite particles P (e.g., along the exemplary lines X). Individual composite particles P each comprise the first reactant R1 and the second reactant R2, but these components remain unreacted, or substantially unreacted.

As used herein, a glassy material refers to materials having a softening point of less than 850° C., a low melting temperature solid reactant has a melting temperature less than or equal to 850° C., and a refractory oxide has a melting temperature greater than 850° C. Thus, in various embodiments, the reactants can include a glass material and a ceramic material. The refractory oxide may be an amorphous material, including a glass. In additional embodiments, the reactants can include at least one amorphous material, at least one glass material, and at least one low melting temperature material, combined with at least one refractory oxide. In each of the embodiments, at least one of the reactants is an amorphous, glassy, or low melting temperature solid reactant and at least one of the reactants is a refractory oxide.

Non-limiting examples of amorphous, glassy, or low melting temperature solid reactants include, for instance, lithium phosphate (LP) glasses (e.g., 25% $Li_2O$+75% $P_2O_5$), lithium aluminum phosphate (LAP) glasses (e.g., 39% $Li_2O$+11% $Al_2O_3$+50% $P_2O_5$), germanium phosphate glasses (e.g., 75% $GeO_2$+25% $P_2O_5$), amorphous aluminum titanium phosphates, crystallized LAP ceramics, and the like. The amorphous, glassy, or low melting temperature solid reactants can further comprise at least one oxide modifier, such as $TiO_2$, $GeO_2$, $SiO_2$, $B_2O_3$, $Fe_2O_3$, $Nb_2O_5$, $V_2O_5$, $Sb_2O_3$, CoO, $WO_3$, and $SnO_2$. An oxide modifier, if used, may be present in the first reactant in a concentration less than or equal to about 30 mol %. For example, the concentration of the at least one oxide modifier can be about 1, 2, 5, 10, 20, 25, or 30 mol % of the amorphous, glassy, or low melting temperature solid reactant. Suitable refractory oxides can include, but are not limited to, metal oxides, such as oxides of formula $MO_2$, e.g., $TiO_2$, $GeO_2$, $SnO_2$, etc.

According to various embodiments, the types and amounts of the first and second reactants can be chosen to achieve a product with the following final stoichiometry:

$$Li_{1+x-y}M_xM'_{2-x-y}M''_y(PO_4)_3 \qquad (I)$$

wherein M is a 3+ ion, M' is a 4+ ion, and M" is a 5+ ion, $0 \leq x \leq 2$, and $0 \leq y \leq 2$. M can be chosen, for example, from Al, Cr, Co, or Fe; M' can be chosen, for example, from Ti, Ge, Sn, or Si; and M" can be chosen, for example, from Nb, Sb, V, or W, although other combinations are possible. In alternative embodiments, the final stoichiometry can be that of formula (II):

$$Li_{1+x}M_xM'_{2-x}(PO_4)_3 \qquad (II)$$

wherein M, M', and x are as defined above.

By way of a non-limiting example, in formula (I), if M is Al, M' is Ti, x is 1, and y is 0, the first reactant could be $Li_2O$—$Al_2O_3$—$P_2O_5$, and the second reactant could be $TiO_2$, both of which can be added in appropriate amounts to achieve the desired stoichiometry. It is to be noted that part of the $TiO_2$ (or other refractory oxide) can be included in the first reactant, thereby reducing the amount of $TiO_2$ (or other refractory oxide) needed to balance the stoichiometry. According to various embodiments, the first reactant can include all or most of the $Li_2O$ and $P_2O_5$ components, as well as part of the additional metal oxides desired in the final stoichiometric composition. The additional metal oxides should be chosen from those oxides that can make a glass with $Li_2O$ and $P_2O_5$.

The first and second reactants can be in the form of powders, which can have, for example, submicron particle size distributions. In some embodiments, the reactants can have an average particle size of less than about 10 microns (e.g., $d_{50}$<10 microns). For example, an average particle size of one or all of the reactants can be less than about 10, 9.5, 9, 8.5, 8, 7.5, 7, 6.5, 6, 5.5, 5, 4.5, 4, 3.5, 3, 2.5, 2, 1.5, 1, 0.5, 0.1, 0.05, or 0.02 microns, including all ranges and subranges therebetween. The average particle size of the first reactant can, in some non-limiting embodiments, be less than about 5 microns, such as ranging from about 1 micron to about 3 microns, whereas the average particle size of the second reactant can be about 1 micron or less, such as ranging from about 0.015 microns to about 0.2 microns.

The reactants can be prepared or otherwise provided prior to mixing. In some embodiments, the reactants can be provided or purchased and used as-is, and/or optionally milled to achieve the desired particle size. In other embodiments, one or more of the reactants may be prepared. For example, the first reactant can be prepared from raw batch materials, e.g., in the case of LAP glass, the raw materials can include $LiH_2PO_4$, $Al(PO_3)_3$, and $(NH_4)_3PO_4$. The raw batch materials may, for example, be in the form of powders, liquids, or combinations thereof.

The raw materials can be mixed, e.g., in a crucible, optionally in the presence of a solvent. For example, suitable solvents may include water, alcohols, liquid hydrocarbons, and combinations thereof. The raw material mixture can then be calcined. It is within the ability of one skilled in the art to select the appropriate calcination conditions, e.g., temperature, equipment, and/or duration as appropriate to achieve the desired final product. According to certain embodiments, the calcining temperature can range from about 200° C. to about 400° C., such as from about 250° C., to about 375° C., or from about 300° C. to about 350° C., including all ranges and subranges therebetween. The calcination residence time can range, for instance, from about 4 hours to about 24 hours or more, such as from about 6 hours to about 12 hours, or from about 8 hours to about 10 hours, including all ranges and subranges therebetween.

After calcining, the mixture can be heated, e.g., in a furnace, at a temperature and for a time sufficient to melt the raw materials and form the first reactant, e.g., the desired amorphous, glassy or low melting temperature solid reactant. Again, it is within the ability of one skilled in the art to choose the appropriate parameters to obtain the desired final product. Exemplary temperatures can range, for instance, from about 1000° C. to about 1300° C., such as from about 1050° C. to about 1250° C., or from about 1100° C. to about 1200° C., including all ranges and subranges therebetween. The residence time can also range, by way of non-limiting example, from about 1 hour to about 6 hours, such as from about 2 hours to about 5 hours, or from about 3 hours to about 4 hours, including all ranges and subranges therebetween.

It should be noted that, in some embodiments, some metal ions that can be included in the first reactant may need relatively high temperatures to melt or enhance devitrification. In order to achieve a fully homogenous melt, it can be necessary to use high temperatures, e.g., greater than about 1000° C. or, in some instances, greater than about 1200° C. However, at such elevated temperatures, various raw materials can volatilize, such as $Li_2O$ and $P_2O_5$. It can thus be advantageous in some embodiments to overbatch, e.g., include excess raw materials (such as $Li_2O$ and $P_2O_5$) accordingly. By way of a non-limiting example, from about 0.5 to about 3 mol % (e.g., about 0.5, 1, 1.5, 2, 2.5, 3 mol %) excess of the raw material that may volatilize at higher temperatures (e.g., $Li_2O$ and $P_2O_5$) can be sufficient to counteract volatilization, for instance, with melt times ranging from about 2 to about 4 hours. Of course, it is within the ability of one skilled in the art to adjust the amounts of the batch materials as appropriate to achieve the desired final stoichiometry.

After melting, the liquid melt can be cooled, e.g., by pouring out onto a stainless steel table and roller quenching to form a thin sheet. In some instances, devitrification can be reduced by rapid cooling, which can be achieved by roller quenching on stainless steel or any other suitable rapid cooling process known in the art. The quenched melt can then be milled or otherwise prepared to form the first reactant, e.g., particles or a powder.

According to the methods disclosed herein, the reactants can be combined using any method known in the art to form a mixture. For example, the reactants can be mixed as dry particulates, e.g., without solvent, or by adding a solvent (such as an aqueous or alcoholic solvent) to create a slurry. In certain embodiments, the reactants are mixed with a solvent chosen from alcohols, e.g., ethanol.

The mixture can then be heated to a first temperature, which is between the glass transition temperature ($T_g$) of the first reactant and the crystallization onset temperature ($T_{onset}$) of the mixture. The first temperature can be, for example, a temperature at which the reactants will form a composite structure without reacting with each other. The first temperature can be chosen, for example, based on DSC-TGA data gathered for a desired mixture of first and second reactants, e.g., a mixture of first and second reactants chosen to achieve the desired stoichiometry.

In some embodiments, the first temperature is chosen such that the first reactant is heated to a sufficient temperature at which it can melt and flow around the second reactant particles. The first temperature can thus be higher than the $T_g$ of the first reactant. According to various embodiments, it can be advantageous to choose a first temperature greater than about 350° C. and/or to choose first reactant materials that have a $T_g$ above 350° C. A high enough $T_g$ (and thus high enough first temperature) can ensure that any organic materials used in the process are burned out before the glass particles sinter together. As such, it may be possible to reduce or eliminate the presence of bubbles or carbonized materials in later processing steps at higher temperatures, which can, in turn, translate to lower membrane porosity (higher density).

In additional embodiments, it may be advantageous to select first and second reactants such that the $T_g$ and $T_{onset}$ are sufficiently spaced apart, e.g., by at least about 50° C., such as at least about 75° C., or at least about 100° C. A larger differential between $T_g$ and $T_{onset}$ provides a wider range of temperatures at which homogenization (e.g., formation of a composite structure) can take place. It can further be advantageous to select a first temperature that is sufficiently close to $T_{onset}$, but that does not exceed $T_{onset}$, to promote melting and flowing of the first reactant without initiating, or without substantially initiating, a reaction between the two components.

Exemplary homogenization temperatures can range, in some embodiments, from about 350° C. to about 550° C., such as from about 375° C. to about 525° C., from about 400° C. to about 500° C., from about 415° C. to about 475° C., or from about 425° C. to about 450° C., including all ranges and subranges therebetween. The first and second reactants can, in certain embodiments, be held at the first temperature for any desired residence time sufficient to form a composite structure. For example, the residence time may range from about 1 hour to about 12 hours, such as from about 2 hours to about 8 hours, from about 4 hours to about 6 hours, including all ranges and subranges therebetween.

After heating, the resulting homogenized composite can be cooled down, e.g., to room temperature, and subsequently milled. In some embodiments, the homogenized composite can be milled to an average particle size of less than or equal to about 2 microns (e.g., $d_{50}$2 micron). For example, the composite particles can have an average particle size of less than or equal to about 2, 1.9, 1.8, 1.7, 1.6, 1.5, 1.4, 1.3, 1.2, 1.1, or 1 microns, including all ranges and subranges therebetween. After milling, the resulting composite particles may contain both glass and refractory oxide, thus providing an improved dispersion as compared to a mixture of two separate powders.

It is to be understood that the heating (or homogenization) and milling steps provide composite particles that still comprise the original first and second reactants, e.g., glass and refractory oxide. In other words, while the second reactant may be interspersed or embedded in the first reactant, the two components remain unreacted, or substantially unreacted, and only the dispersion characteristics are changed. It is also to be understood that the homogenized composite and/or composite particles can comprise a small percentage of fully reacted material, for example, less than about 5% reacted material, such as less than about 4%, 3%, 2%, 1%, 0.5%, 0.1%, 0.05%, or 0.01%, including all ranges and subranges therebetween. In some embodiments, the homogenized component and/or composite particles are free of reacted material. In other embodiments the homogenized composite and/or composite particles are essentially free of reacted materials.

The heating (or homogenization) step disclosed herein may have numerous advantages over other methods. For instance, in contrast to spray drying, which essentially mixes two components in a slurry and aerosolizes the mixture to produce microparticles (of two separate components), the instant homogenization method forms a composite in which the two reactants are physically bonded, for instance, the second reactant may be embedded or interspersed in a matrix formed by the first reactant. Thus, unlike spray drying, the subsequent product can withstand the rigors of milling and will break apart as smaller pieces of composite, rather than into smaller pieces of the separate components (see, e.g., FIG. 1). Further, in contrast to plasma melting homogenization methods, the composite particles produced by the instant methods remain unreacted, or substantially unreacted due to processing at temperatures below $T_{onset}$. Thus, the particles can be milled and cast as a green body which can then be simultaneously reacted and densified during a sintering step. Accordingly, membranes made according to the methods disclosed herein can have significantly higher densities than membranes made according to prior art methods.

Subsequent to milling, the composite particles can be cast to form a green body, e.g., by tape casting or similar techniques, and can then be sintered to form a membrane. In certain embodiments, it may be advantageous to combine composite particles with varying amounts of the first and second reactants (e.g., non-homogenized reactants). For example, in some instances, the stoichiometry of the composite particles may not fall within the targeted final stoichiometry of the membrane. It can thus be desirable to combine the composite particles with amounts of the first or second reactant to achieve the correct stoichiometry. For instance, composite particles rich in the second reactant can be combined with the first reactant to correct stoichiometry, and vice versa.

During reactive sintering the first and second reactants (e.g., as combined in the composite particles or as separate additions) can react to produce the final membrane product while the structure is simultaneously densified. In other words, the reaction and densification processes at least partially overlap with one another during sintering. According to various embodiments, the first reactant can mobilize the diffusion of the reactant components, which may promote sintering. As such, the advantage of a mobilizing glass or low melting temperature liquid phase can be provided without the accompanying issues of environmental instability, because the first reactant is substantially consumed during the sintering step to yield the final product.

It is within the ability of one skilled in the art to determine the appropriate method and conditions for the sintering step, such as, for example, firing conditions including equipment, temperature, and duration. Such methods and conditions may depend, for example, upon the properties of the green body, e.g., composition, as well as the desired properties of the resulting product. Suitable sintering temperature can include, by way of non-limiting example, temperatures below 1100° C., such as less than about 1100° C., 1050° C., 1000° C., 950° C., 900° C., or 850° C., including all ranges and subranges therebetween. Moreover, exemplary residence times at the sintering temperature can range, for example, from about 30 minutes to about 12 hours, such as from about 1 hour to about 10 hours, from about 2 hours to about 8 hours, or from about 4 hours to about 6 hours, including all ranges and subranges therebetween. During sintering, the membrane may be placed between two setter plates. The setter plates can comprise any material suitable for sintering at the desired temperature, for instance, alumina, zirconia, and other refractory ceramic materials, to name a few.

According to various embodiments, the sintering temperature can be less than about 900° C. Sintering at lower temperatures may provide several advantages, including enhanced process control and/or reduced material loss, such as lithium and phosphate, which can volatilize at temperatures in excess of 1000° C. Less volatilization during sintering can also translate to reduced porosity, i.e., increased density. Moreover, a lower sintering temperature can reduce or eliminate the precipitation of $GeO_2$ at elevated temperatures.

After sintering, the membrane can be further processed according to any conventional methods known in the art. For example, the flatness of the membrane can be improved by a creep flattening step as disclosed herein. In some embodiments, the membrane can be substantially flat after sintering and thus the method may not include a flattening step. Other optional processing steps include trimming, cutting, or shaping the membrane, and so on.

Solid Electrolyte Membranes

Figure 2:
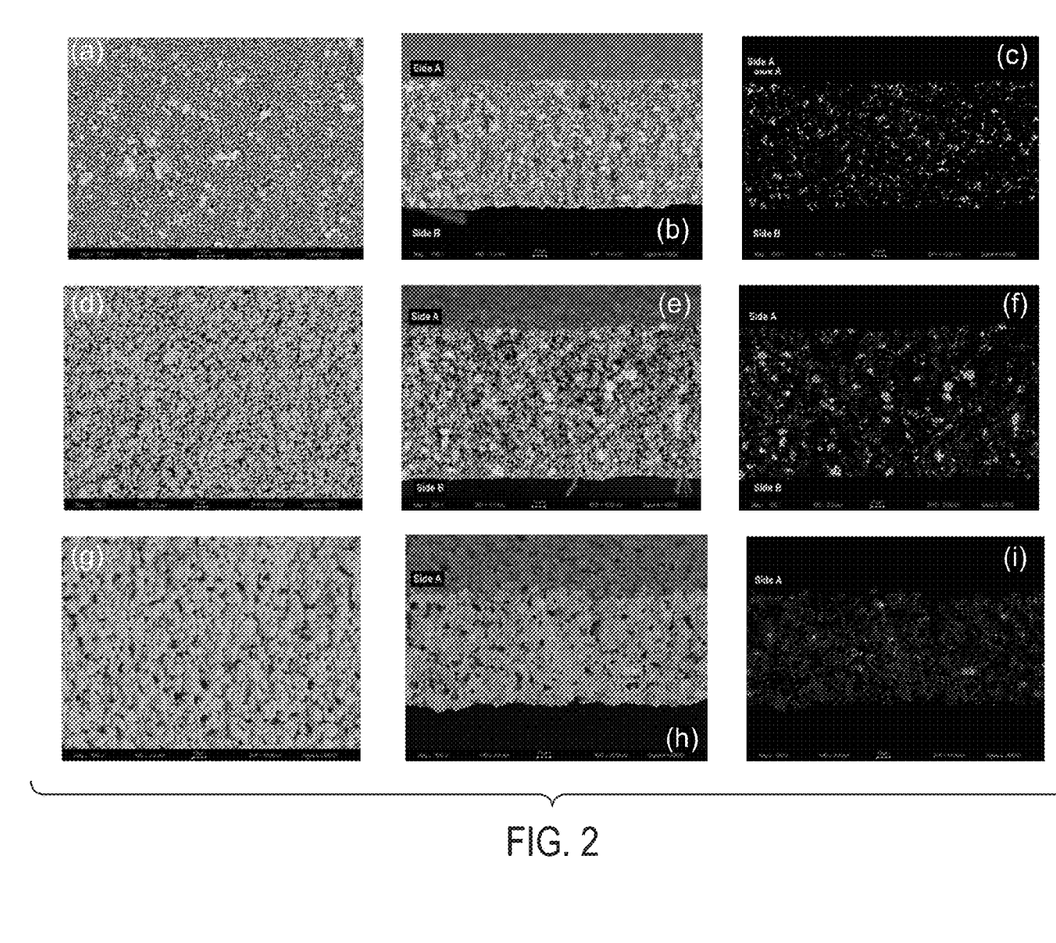
FIG. 2 illustrates SEM images of an LAGP electrolyte membrane taken during various phases of manufacture using a comparative method.

FIG. 2 depicts scanning electron microscopy (SEM) images for an LAGP electrolyte membrane taken during various steps in a manufacturing process not in accordance with the present disclosure (e.g., without a homogenization step). Images (a)-(c) illustrate the surface, cross-section, and contrast enhanced cross-section of the membrane, respectively, after organic burnout. Likewise, images (d)-(f) illustrate the surface, cross-section, and contrast enhanced cross-section of the membrane, respectively, after sintering at 700° C. for hours. Images (g)-(i) illustrate the surface, cross-section, and contrast enhanced cross-section of the membrane, respectively, after sintering at 900° C. for hours. These images represent a progression of the microstructure of the membrane during the sintering process. It can be seen from FIG. 2 that inhomogeneity exists throughout the membrane (in the form of sporadic $GeO_2$ pockets) starting from the time the membrane is cast as a green tape, with segregation apparent throughout the sintering process. The segregation of $GeO_2$ can form $GeO_2$ rich phases at the grain boundary, which can affect the solubility of the grain boundary and compromise the reliability of the membrane.

Various embodiments disclosed herein relate to substantially dense, homogeneous electrolyte membranes that may not have one or more of the disadvantages discussed above. For instance, disclosed herein are solid lithium ion electrolyte membranes having a composition represented by the formula $Li_{1+x-y}M_xM'_{2-x-y}M''_y(PO_4)_3$, wherein M is a 3+ ion, M' is a 4+ ion, M" is a 5+ ion, $0 \leq x \leq 2$, and $0 \leq y \leq 2$, and wherein the solid lithium electrolyte membranes are substantially flat. The solid membranes can, in some embodiments, have a thickness of less than about 200 microns, a density of at least about 95% of the theoretical density of the solid membrane, and a conductivity of at least about $1 \times 10^{-5}$ S/cm, such as at least about $1 \times 10^{-4}$ S/cm. In various embodiments, the solid membranes may be hermetic, homogeneous, or substantially homogeneous.

As used herein the terms "homogeneous," "substantially homogeneous," and variations thereof are intended to denote that the homogenized composite, homogenized particles, cast green body, and/or membrane exhibits chemical homogeneity across a length scale approximately equal to one or more of its dimensions. For instance, for an exemplary homogenized particle having an average particle size of 1 micron, the particle can be substantially homogeneous across a length scale approximately equal to 1 micron. Likewise, membranes having an average thickness of about 100 microns may be homogeneous across a length scale of about 100 microns. For example, the membrane may be homogeneous across a length scale ranging from about 10 microns to about 200 microns, from about 20 microns to about 190 microns, from about 30 microns to about 180 microns, from about 40 microns to about 170 microns, from about 50 microns to about 160 microns, from about 60 microns to about 150 microns, from about 70 microns to about 140 microns, from about 80 microns to about 130 microns, from about 90 microns to about 120 microns, or from about 100 microns to 110 microns, and all ranges and subranges therebetween.

As used herein, the term "hermetic" is intended to denote that the membrane is substantially impervious to the diffusion of liquids or gasses, e.g., between the anode and cathode. The hermetic properties of the membrane can depend, for instance, on the membrane density. According to various embodiments, the methods disclosed herein can provide an electrolyte membrane with a density of at least about 95% of its theoretical density, such as at least about 96%, 97%, 98%, 99%, 99.9%, or 99.99%, including all ranges and subranges therebetween.

Electrolyte membranes prepared according to the methods disclosed herein can also be flat, or substantially flat, and can achieve such properties without the need for a creep flattening step, as discussed above. According to various embodiments, "flatness" and variations thereof is used to denote a substantially level surface devoid of visible elevations or depressions. For instance, such elevations or depressions can be caused by wrinkling or rending of the membrane after processing (e.g., due to adhesion to the setter plates). In certain embodiments, substantially flat is used to define a membrane that measures less than about 1 mm out-of-plane per 1 cm of in-plane length, such as less than about 0.9, 0.8, 0.7, 0.6, 0.5, 0.4, 0.3, 0.2, or 0.1 mm out-of-plane per 1 cm of in-plane length.

By way of a non-limiting example, the electrolyte membranes disclosed herein can have a thickness of less than about 200 microns, such as less than about 150 microns, less than about 100 microns, or less than about 50 microns, including all ranges and subranges therebetween. Further, the conductivity of the membrane can be greater than about $1 \times 10^{-5}$ S/cm, such as greater than about $1 \times 10^{-4}$ S/cm. In some instances, the conductivity can be greater than about $2 \times 10^{-4}$ S/cm, such as greater than about $3 \times 10^{-4}$ S/cm, $4 \times 10^{-4}$ S/cm, or $5 \times 10^{-4}$ S/cm, including all ranges and subranges therebetween.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a solvent" includes examples having two or more such "solvents" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Other than in the Examples, all numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a temperature less than 1000° C." and "a temperature less than about 1000° C." both include embodiments of "a temperature less than about 1000° C." as well as "a temperature less than 1000° C."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a mixture comprising A+B+C include embodiments where a mixture consists of A+B+C, and embodiments where a mixture consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The following Examples are intended to be non-restrictive and illustrative only, with the scope of the invention being defined by the claims.

EXAMPLES

LAGP Via LAP Glass and $GeO_2$

A lithium-ion ceramic electrolyte of composition $Li_{1+x}Al_xGe_{2-x}(PO_4)_3$ was prepared according to the following process. A lithium-aluminum-phosphate (LAP) glass of composition $Li_2O$—$Al_2O_3$—$P_2O_5$ (29.15, 8.66, 62.19 mol %, respectively) was first prepared by batching 400 g of $LiH_2PO_4$, $Al(PO_3)_3$, and $(NH_4)_3PO_4$ (with 1 mol % excess of $Li_2O$) in a 650 cc covered Pt crucible and melting the mixture at 1200° C. for 2 hours. Batching was carried out by dry mixing the powder sources followed by mixing in the Pt crucible with liquid ammonium phosphate. The slurry was then calcined at 300° C. overnight after which the crucible was transferred to a furnace operating at 1200° C. for a time period of 2 hours. The resulting melt was poured onto a stainless steel table and roller quenched to form a thin sheet.

The LAP glass was milled to a powder and combined with $GeO_2$ powder. The resulting mixture was analyzed by differential scanning calorimetry (DSC), which determined that $T_g$ was 380° C., $T_{onset}$ was 495° C., and $T_{peak}$ was 515° C. The first temperature (homogenization temperature) was thus set at 415° C. The mixture was heated to the first temperature and held at that temperature for 6 hours. After heating, X-ray diffraction analysis was performed. The XRD pattern showed only $GeO_2$ peaks on a glassy background, indicating that no reaction occurred between the two reactants during heating. The homogenized composite was then milled to an average particle size of 1 micron using a jet-mill.

Figure 3A:
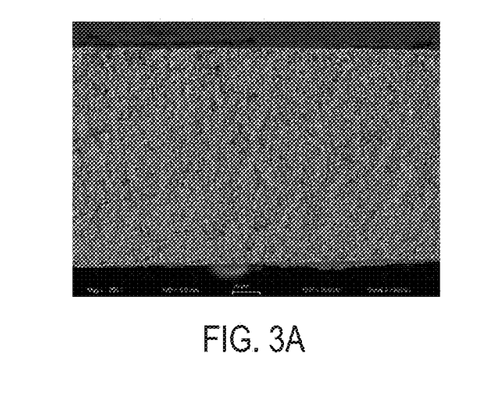
FIGS. 3A-B are SEM images of an LAGP electrolyte membrane manufactured by a method according to various embodiments of the disclosure.
Figure 3B:
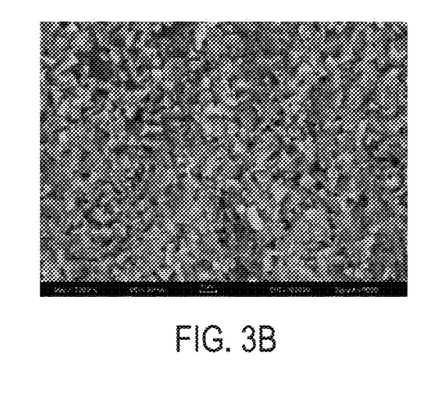

Homogenized particles thus formed were then combined with an ethanol based solvent system and other organics such as a dispersant, binder, and plasticizer, to give approximately 48 vol % solid loading. The mixture was incorporated into a tape casting slip, cast to form a green tape, and fired between two $Al_2O_3$ setter boards at 910° C. for 8 hours. SEM images of a cross-section of the membrane and a surface of the membrane are shown in FIGS. 3A and 3B, respectively. FIG. 3A shows a dense, homogeneous cross-section substantially devoid of $GeO_2$ segregation (compare, e.g., images (b), (e), (h) in FIG. 2). Moreover, as illustrated in FIG. 3B, the grain size of the final product appeared very uniform with an average size of about 1 micron.

Comparative Studies

Conductivity: The conductivity of the membrane produced above was measured and ranged from $2.17 \times 10^{-4}$ S/cm to $2.21 \times 10^{-4}$ S/cm. By way of comparison, a similar membrane made without the heating (homogenization) step and fired at 950° C. had a conductivity in the range of $1.93 \times 10^{-5}$ S/cm to $1.91 \times 10^{-4}$ S/cm. Without wishing to be bound by theory, it is believed that the increased conductivity in the membranes according to the disclosure is due to the absence or reduction of secondary (inhomogeneous) phases as compared to the comparative (non-homogenized) membrane.

Figure 4A:
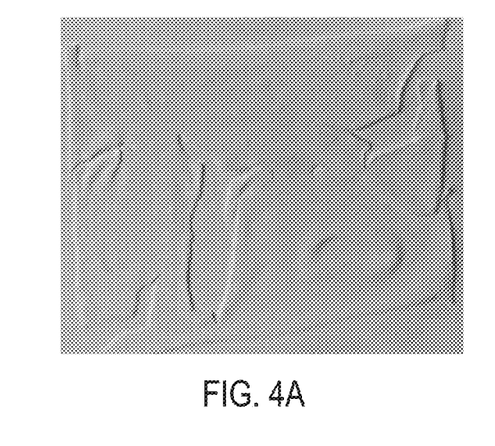
FIG. 4A-B are images of LAGP electrolyte membranes manufactured by a comparative method and by a method according to various embodiments of the disclosure.
Figure 4B:
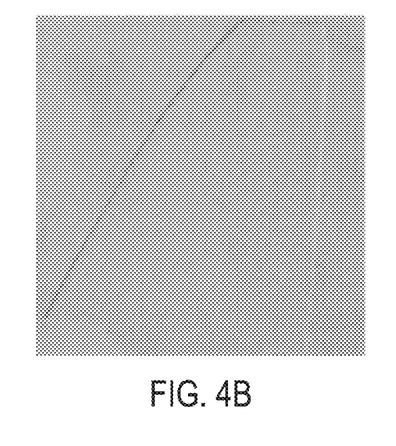

Flatness: Two green tapes were prepared, one using the above method with a homogenization step and one using a method without a homogenization step. The tapes were fired at 910° C. between two $Al_2O_3$ setter boards for 8 hours. FIG. 4A shows the final membrane produced using the existing process (no homogenization step) and FIG. 4B shows the final membrane produced using the methods disclosed herein. As can be seen from a comparison of FIGS. 4A and 4B, the membrane prepared according to the methods disclosed herein was significantly improved over the membrane prepared without a homogenization step. The tape prepared using the existing process stuck to the setter plates during sintering, which resulted in wrinkling and rupturing of the tape, whereas the tape prepared using the method disclosed herein did not stick to the setter plate and thus resulted in a substantially flat final membrane.

What is claimed is:

1. A method for making a solid lithium ion electrolyte membrane, comprising:
   combining a first reactant chosen from lithium phosphate glasses, germanium phosphate glasses, lithium aluminum phosphate glasses, and crystallized lithium aluminum phosphate ceramics with a second reactant chosen from refractory oxides to form a mixture;
   heating the mixture to a first temperature to form a homogenized composite comprising unreacted first and second reactants, wherein the first temperature is between a glass transition temperature of the first reactant and a crystallization onset temperature of the mixture;
   milling the homogenized composite to form homogenized particles;
   casting the homogenized particles to form a green body; and
   reactively sintering the green body at a second temperature to form a solid membrane.

2. The method of claim 1, wherein the first reactant further comprises an oxide modifier.

3. The method of claim 2, wherein the oxide modifier is chosen from $TiO_2$, $GeO_2$, $SiO_2$, $B_2O_3$, $Fe_2O_3$, $Nb_2O_5$, $V_2O_5$, $Sb_2O_3$, $CoO$, $WO_3$, $SnO_2$, and combinations thereof.

4. The method of claim 1, wherein the first reactant is lithium aluminum phosphate.

5. The method of claim 1, wherein the second reactant is chosen from $TiO_2$, $SnO_2$, $GeO_2$, and combinations thereof.

6. The method of claim 1, wherein the first reactant has an average particle size of less than about 10 microns, and the second reactant has an average particle size of less than about 1 micron.

7. The method of claim 1, wherein the first temperature is at least about 350° C.

8. The method of claim 1, wherein the first temperature ranges from about 350° C. to about 550° C.

9. The method of claim 1, wherein the homogenized particles have an average diameter ranging from about 1 micron to about 2 microns.

10. The method of claim 1, wherein the second temperature is less than about 1100° C.

11. The method of claim 1, wherein casting comprises tape casting the homogenized particles to form a green tape.

12. The method of claim 1, wherein the solid membrane has a thickness of less than about 200 microns, a density of at least about 95% of a theoretical density of the solid membrane, and a conductivity of at least about $1 \times 10^{-4}$ S/cm.

13. The method of claim 1, wherein the solid membrane is substantially flat.

14. The method of claim 13, wherein the method does not comprise a flattening step after the sintering step.

* * * * *